United States Patent
Di Nunzio

(10) Patent No.: US 8,322,377 B2
(45) Date of Patent: Dec. 4, 2012

(54) VALVE

(76) Inventor: David Di Nunzio, Mentor, OH (US)

( * ) Notice: Subject to any disclaimer, the term of this patent is extended or adjusted under 35 U.S.C. 154(b) by 1032 days.

(21) Appl. No.: 12/244,841

(22) Filed: Oct. 3, 2008

(65) Prior Publication Data
US 2009/0090414 A1 Apr. 9, 2009

Related U.S. Application Data

(60) Provisional application No. 60/997,651, filed on Oct. 4, 2007.

(51) Int. Cl.
*F16K 11/18* (2006.01)

(52) U.S. Cl. ............. 137/636.3; 137/625.41; 137/636.4; 137/801; 239/280.5; 239/408; 239/525; 239/539; 239/541; 239/581.2

(58) Field of Classification Search ............. 137/625.41, 137/636.3, 636.4, 625–636.17, 801; 4/675, 4/676–677; 239/280, 280.5, 281, 408, 413, 239/414, 443, 525–532, 537–541, 581.1, 239/581.2
See application file for complete search history.

(56) References Cited

U.S. PATENT DOCUMENTS

| | | | |
|---|---|---|---|
| 1,564,856 A | 12/1925 | Karlsen | |
| 2,465,458 A | 3/1949 | Jordan | |
| 2,693,826 A | 11/1954 | Vaughan et al. | |
| 2,877,797 A | 3/1959 | Jordon et al. | |
| 2,976,887 A | 3/1961 | Wilson | |
| 3,338,267 A | 8/1967 | Weaver | |
| 3,373,770 A * | 3/1968 | Ward et al. | 137/615 |
| 3,490,492 A | 1/1970 | Fairchild | |
| 3,490,493 A | 1/1970 | Eversman | |
| 3,580,500 A | 5/1971 | Quinn | |
| 3,886,638 A | 6/1975 | Hayman et al. | |
| 4,200,123 A | 4/1980 | Brandelli | |
| 4,299,354 A | 11/1981 | Ketley | |
| 4,463,899 A | 8/1984 | Tacchi | |
| 4,727,906 A | 3/1988 | Holzer | |
| 4,768,557 A | 9/1988 | Holzer | |
| 5,100,565 A | 3/1992 | Fujiwara et al. | |
| 5,127,438 A | 7/1992 | Williams | |
| 5,201,468 A * | 4/1993 | Freier et al. | 239/383 |
| 5,735,467 A * | 4/1998 | Lee | 239/414 |
| 6,708,895 B1 | 3/2004 | Knapp | |
| 6,959,731 B2 * | 11/2005 | Bartkus et al. | 137/625.46 |
| 7,040,348 B2 | 5/2006 | Bolgar et al. | |
| 7,114,515 B2 | 10/2006 | Sponheimer et al. | |
| 7,143,786 B2 | 12/2006 | Romero | |

(Continued)

FOREIGN PATENT DOCUMENTS

CA 2516879 A1 2/2007

(Continued)

*Primary Examiner* — Craig Schneider
*Assistant Examiner* — Jessica Cahill
(74) *Attorney, Agent, or Firm* — Driggs, Hogg, Daugherty & Del Zoppo, Co., LPA

(57) ABSTRACT

A valve includes a generally cylindrical housing including first and second end portions that are offset from each other along a longitudinal axis of the generally cylindrical housing. First and second inlet ports are arranged on one of said first or second end portions, and at least one outlet port is arranged on one of said first or second end portions. A disk is disposed in the generally cylindrical housing and is configured to independently control both mixing and flow rate of fluid flowing into at least one of the first and second inlet ports.

12 Claims, 10 Drawing Sheets

U.S. PATENT DOCUMENTS

| | | | |
|---|---|---|---|
| 7,147,005 B2 | 12/2006 | Zucchetti et al. | |
| 7,314,062 B2 * | 1/2008 | Chen | 137/625.41 |
| 7,343,930 B2 | 3/2008 | Rosko | |
| 7,607,449 B2 * | 10/2009 | Herring et al. | 137/15.18 |
| 7,717,131 B2 * | 5/2010 | Creswell et al. | 137/625.46 |
| 2003/0001028 A1 * | 1/2003 | Brattoli et al. | 239/525 |
| 2004/0010848 A1 * | 1/2004 | Esche | 4/675 |
| 2004/0074543 A1 | 4/2004 | Dickson et al. | |
| 2005/0045549 A1 * | 3/2005 | Lutich | 210/295 |
| 2006/0130916 A1 * | 6/2006 | Egli | 137/636.3 |
| 2006/0180216 A1 | 8/2006 | Gaenzle et al. | |
| 2007/0221740 A1 | 9/2007 | Beck et al. | |
| 2008/0093469 A1 | 4/2008 | Kline | |
| 2008/0128035 A1 * | 6/2008 | Fleischmann | 137/625.41 |
| 2008/0178935 A1 | 7/2008 | Thomas | |

FOREIGN PATENT DOCUMENTS

| | | |
|---|---|---|
| DE | 2341585 | 4/1974 |
| DE | 202005018738 U1 | 3/2006 |
| WO | 2004040179 A1 | 5/2004 |

* cited by examiner

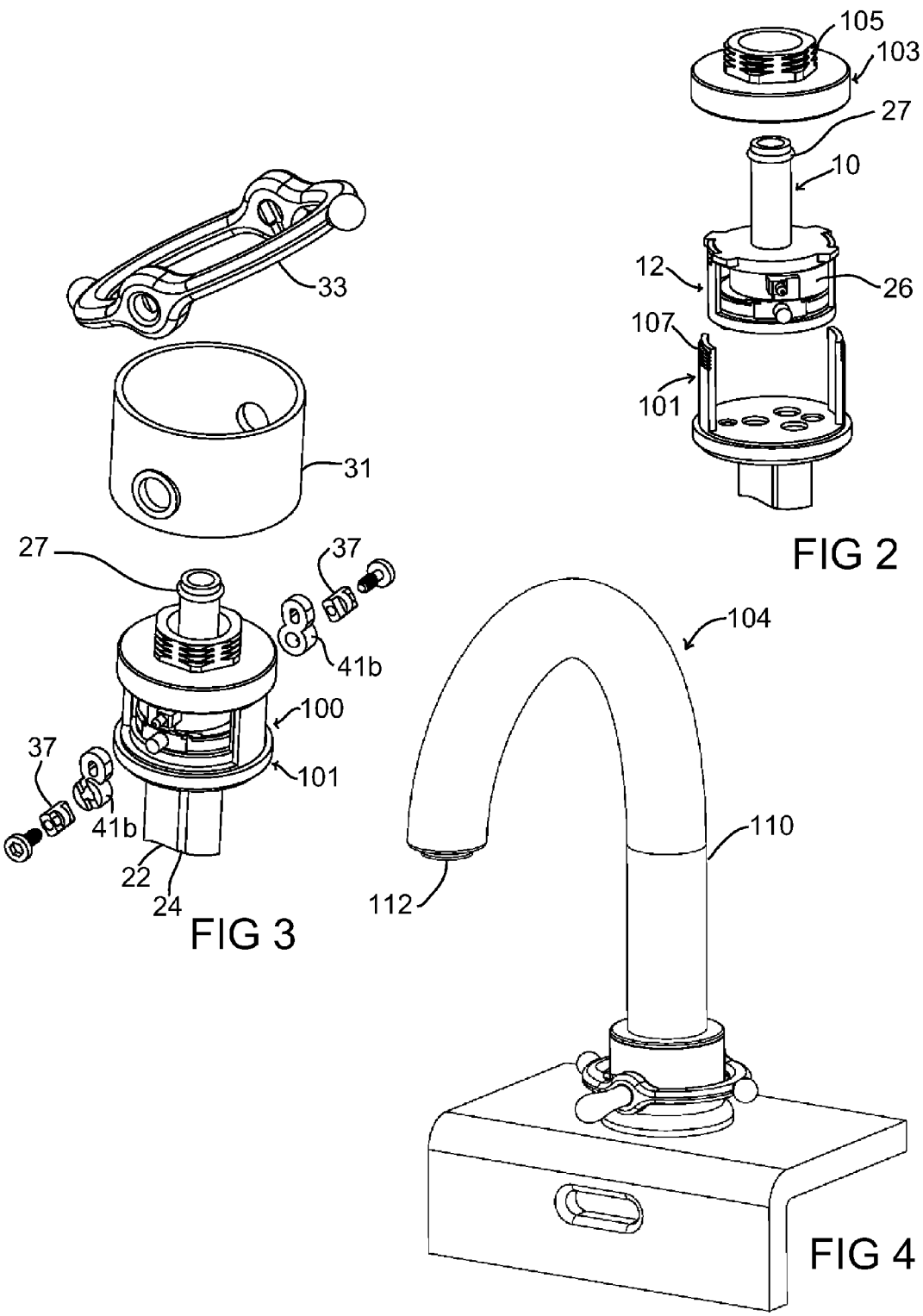

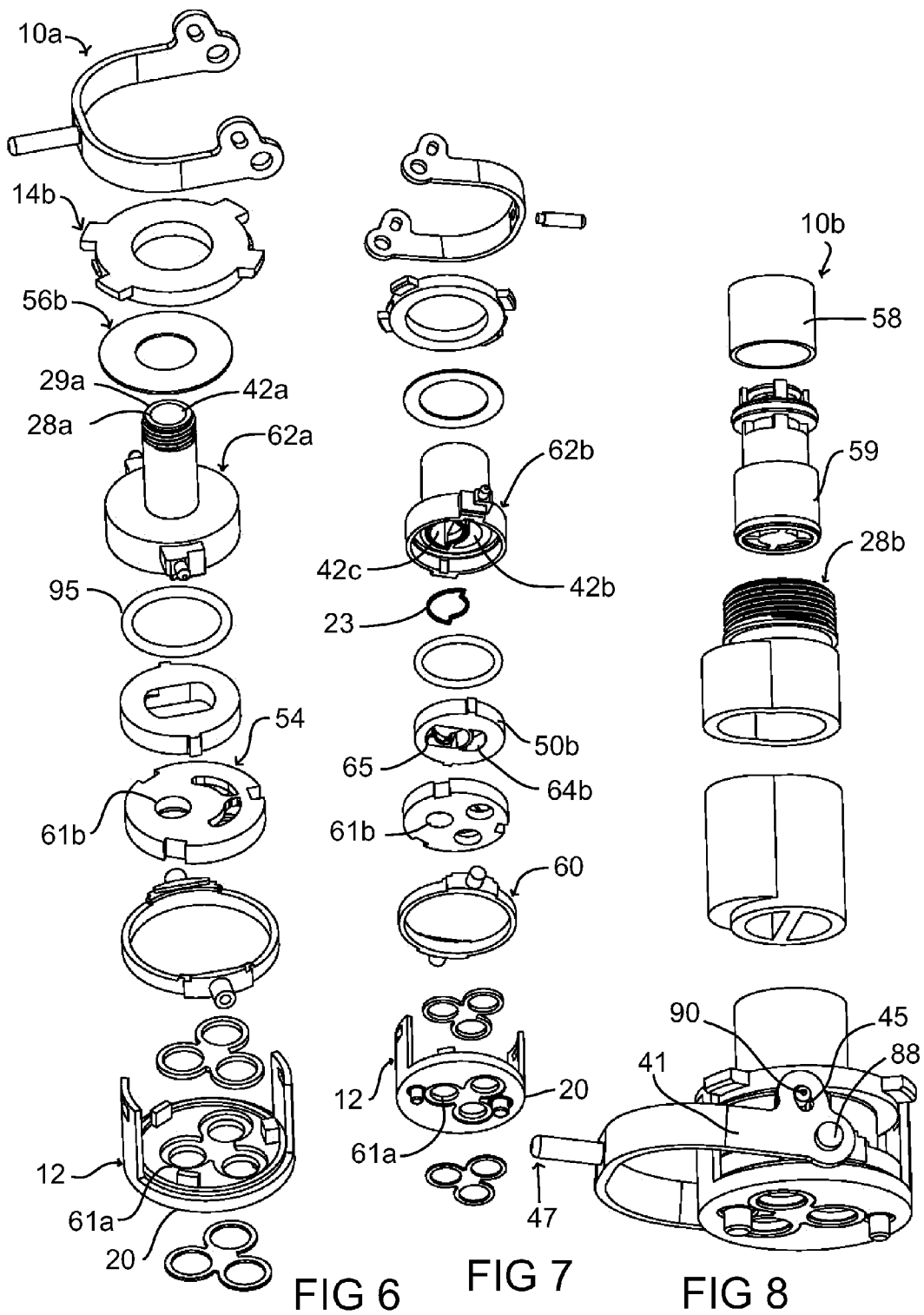

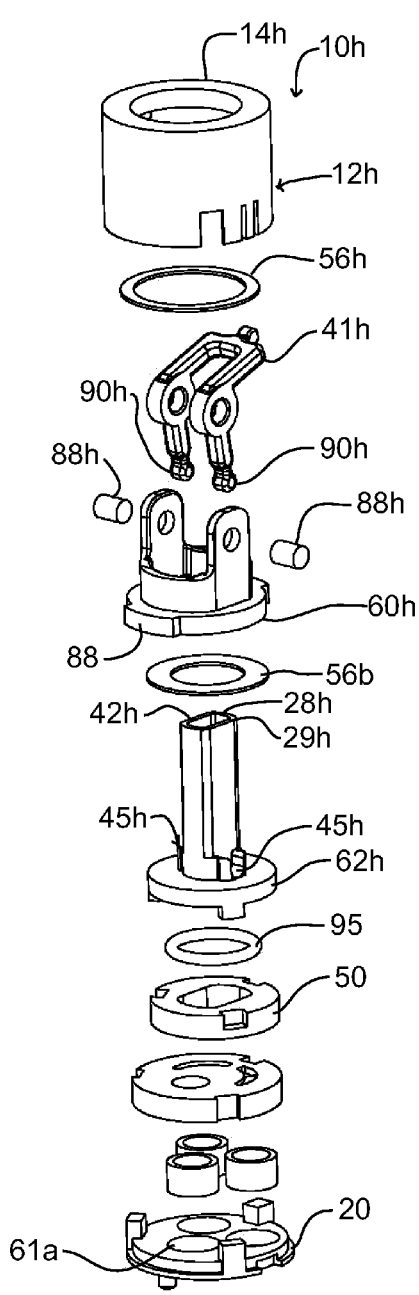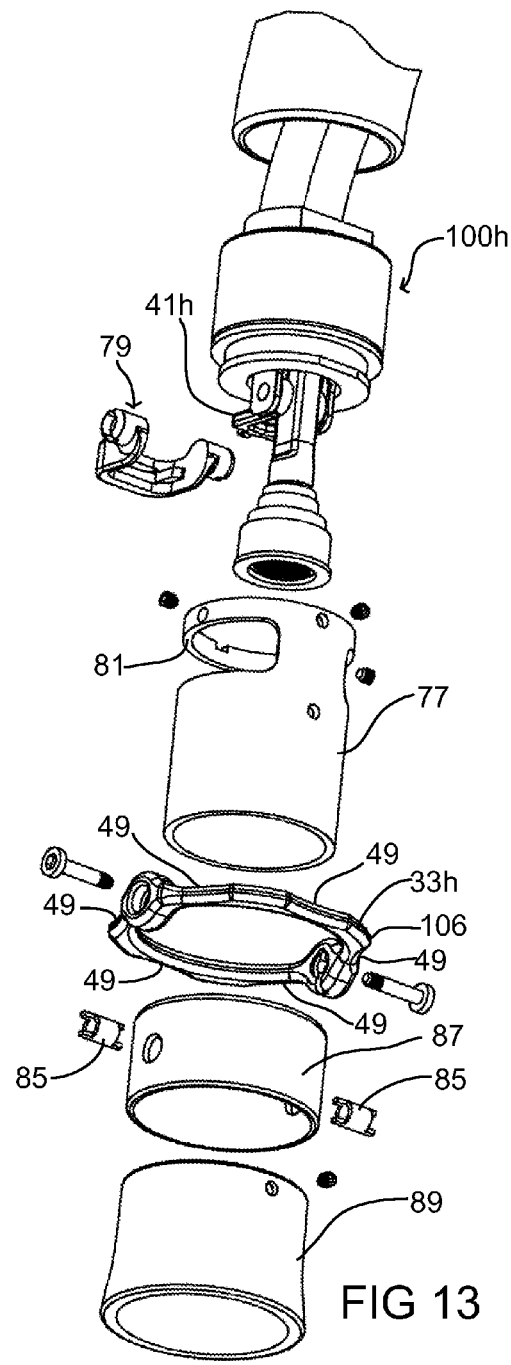

VALVE

CROSS-REFERENCE TO RELATED APPLICATIONS

This application claims priority to, and any other benefit of, U.S. Provisional Patent Application Ser. No. 60/997,651, filed Oct. 4, 2007, and titled "Treatise on flow through mixing valves," which is hereby incorporated by reference in its entirety.

TECHNICAL FIELD

The following relates to a valve.

BACKGROUND

Various valves to control the flow of water are known for residential applications such as kitchen or lavatory fixtures or bath/shower fixtures. Some valves have included more than one user interface or handle to control temperature and flow. Other valves have included a single handle to control temperature and flow. Still other valves operate with unified handle-spout combinations. Generally, unified handle-spout combination valves require drastically different and highly dependent spout outlet positions relative to non-universal handle spout combination valves.

SUMMARY

Aspects of the present application address the above-referenced matters and others.

According to one aspect, a valve includes a generally cylindrical housing including first and second end portions that are offset from each other along a longitudinal axis of the generally cylindrical housing. First and second inlet ports are arranged on one of said first or second end portions, and at least one outlet port is arranged on one of said first or second end portions. A disk is disposed in the generally cylindrical housing and is configured to independently control both mixing and flow rate of fluid flowing into at least one of the first and second inlet ports.

According to another aspect, a valve includes a generally tubular housing with two end portions, a first inlet port located on one of said two end portions, a disk that controls flow of fluid entering said inlet port and a peripheral linkage that communicates with said disk from along side the generally tubular housing axis to move said disk within said housing; wherein said peripheral linkage translates the disk relative to a longitudinal axis of the housing.

According to another aspect, a method includes independently controlling mixing and flow rate of fluid flowing in a longitudinal direction through an elongate generally cylindrical housing of a valve that includes at least two inlet ports on an end of the housing and at least one outlet port on the same or another end of the housing.

BRIEF DESCRIPTION OF THE DRAWINGS

The above aspects and additional aspects, features and advantages will become readily apparent by describing in detail exemplary embodiments thereof with reference to the attached drawings, wherein like reference numerals typically denote like elements, and:

FIGS. 1-5 are views according to an exemplary embodiment;

FIG. 6 is an exploded perspective end view of an exemplary valve;

FIG. 7 is in part an exploded perspective end view of an exemplary valve;

FIG. 8 is a partial exploded perspective end view of an exemplary auto-diverter valve;

FIG. 12 is an exploded perspective end view of an exemplary valve;

FIG. 13 is an exploded perspective view of an exemplary coupling with the exemplary valve of FIG. 12 with alternate exemplary handle sleeve control components;

DETAILED DESCRIPTION

Figure 1:
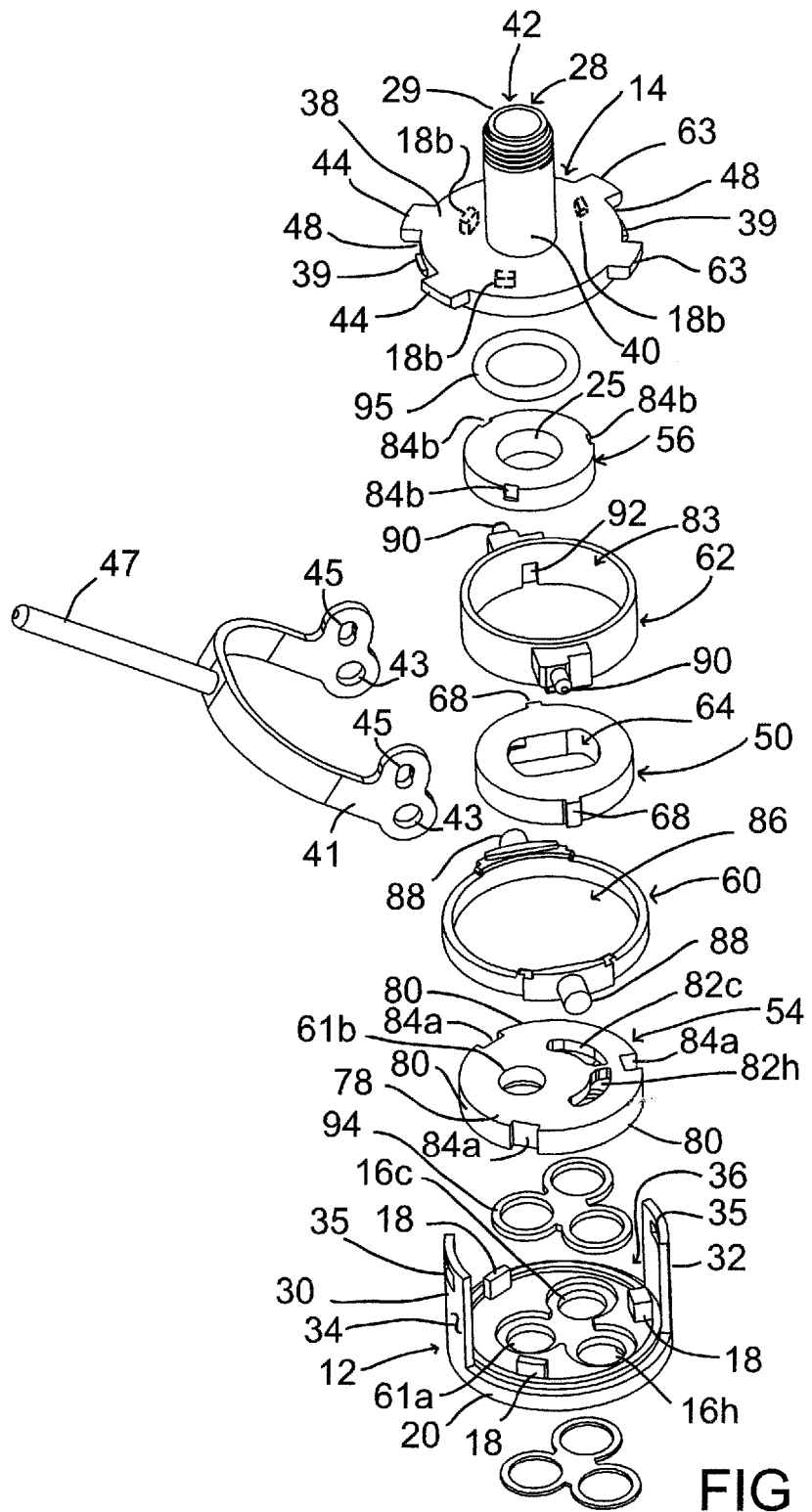

FIGS. 1-3 illustrate a valve 10 that includes a body 12 and a cap 14. The body 12 includes a bottom 20 with first and second material free regions or bores 16c, 16h formed therethrough. In this example, the first and second bores 16c, 16h allow fluid communication between the body 12 and a pair of water supply lines from an external water source. A valve cartridge 26 is supported within valve body 12 and selectively controls water supplied through the valve 10 and discharged from an outlet port 28.

The body 12 includes the bottom portion 20 and first and second arms 30, 32 integrally formed therewith. In the illustrated examples, the bottom portion 20 is generally tubularly or cylindrically shaped, with the first and second bores 16c, 16h being formed therethrough in a generally symmetric relationship. The first and second arms 30, 32 extend from the bottom portion 20, and each arm 30, 32 includes an arcuate surface 34 defining a portion of a cylindrical wall extending axially upward from bottom portion 20. In one instance, the first and second arms 30, 32 cooperate with the bottom portion 20 to define an interstitial space 36 operable to receive the valve cartridge 26.

The cap 14 includes first and second generally cylindrical portions 38, 40, an end portion 29 with central bore 42 formed therethrough, and two pair of flanges 44, 63. The first generally cylindrical portion 40 is disposed adjacent the second generally cylindrical portion 38 and is configured to retain a seal 27 for sealing the central bore 42. Seal 27 is shown in FIGS. 2 and 3. The flanges 44, 63 extend radially from the second cylindrical portion 38 and each pair defines a recess 48 therebetween. The recesses 48 are operable to receive the first and second arms 30, 32 of the body 12. A pair of tabs 39 extends from the second generally cylindrical portion 38 in recesses 48 and engages apertures 35 formed through the first and second arms 30, 32. The cap 14 may be releasably coupled to the body 12. The cartridge 26 is disposed between the end portion 29 and the bottom portion 20, and is operable to control an amount of fluid flowing through the first and second bores 16c, 16h.

The illustrated valve 10 includes a rotatable and translatable disk 50, first stationary disk 54, optional second stationary disk 56, a temperature adjustment ring 60, and a flow adjustment ring 62. The rotatable and translatable disk 50 is generally cylindrically shaped and includes a pair of ears 68 extending radially from an outer edge thereof. The rotatable and translatable disk 50 includes a bore 64.

The first stationary disk 54 includes a generally circular main body 78, flanges 80, and a pair of bores 82c, 82h. The bores 82c, 82h are in a symmetric relationship and generally include an arcuate shaped upper bore transforming into a circular shaped lower bore. The flanges 80 extend from the main body 78 and form recesses 84a therebetween. The recesses 84a engage pawls 18 and align the stationary disk 54 with the bottom portion 20 and prevent rotation therebetween. As such, the recesses 84a may concurrently prevent rotation of the disk 54 and facilitate aligning the cartridge 26 with the body 12. The second stationary disk 56 includes recesses 84b that engage pawls 18b shown with hidden lines through end portion 29. As such, the recesses 84b may concurrently prevent rotation of the disk 56 and facilitate aligning the cartridge 26 with the end portion 29.

The temperature adjustment ring 60 and the flow adjustment ring 62 include central bores 86, 83, respectively, and first and second extensions 88, 90, respectively. The central bore 86 receives the first stationary disk 54. The temperature adjustment ring 60 is rotatably positioned around the first stationary disk 54. The central bore 83 of the flow adjustment ring 62 receives the rotatable and translatable disk 50 for translation relative to the temperature adjustment ring 60. An inner surface of bore 83 includes a pair of slots 92 formed opposite one another, and the slots 92 receive the ears 68 of the rotatable and translatable disk 50. The engagement between the ears 68 and the slots 92 may serve to selectively fix the rotatable and translatable disk 50 for co-translation of the flow adjustment ring 62 and the rotatable and translatable disk 50 with respect to the temperature adjustment ring 60.

The temperature adjustment ring 60 and the flow adjustment ring 62 are mechanically linked together by a link 41. Link 41 includes a distal end 47, a pair of bores 43 and a pair of arcuate grooves 45. Link 41 receives first and second extensions 88 and 90 in bores 43 and arcuate grooves 45 respectively. Link 41 rotatively interfaces extensions 88 by receiving extensions 88 in bores 43. Link 41 translatively interfaces extensions 90 by receiving extensions 90 in arcuate grooves 45. In one instance, arcuate grooves 45 only translate towards extensions 90 via rotative motion of link 41 about bores 43.

The temperature adjustment ring 60, and hence the rotatable and translatable disk 50 rotate about a cylindrical axis of the temperature adjustment ring 60 when a force is applied to the link 41 about the axis of the generally cylindrical body of the bottom portion 20. Applying a force to the link 41 along the axis of the generally cylindrical body of the bottom portion 20 rotates the link 41 about bores 43 and ultimately extensions 88 and translates the flow adjustment ring 62, and hence the rotatable and translatable disk 50. The two perpendicular forces can be applied to the link 41 at distal end 47 as well. Both forces result in a rotation of link 41 relative to the generally cylindrical exemplary valve 10. Each respective force results in different movement of the rotatable and translatable disk 50.

As shown, in one instance, the rotatable and translatable disk 50, stationary disks 54, 56, temperature adjustment ring 60, and flow adjustment ring 62 are stacked in a predetermined relationship relative one another. For example, the first stationary disk 54 can be placed adjacent the bottom portion 20 with a gasket 94 disposed therebetween. The gasket 94 may effectively seal an area around the bores 16c, 16h of the bottom portion 20 and the bores 82c, 82h of the stationary disk 54. The gasket 94 mitigates leakage. The first stationary disk 54 is aligned with the bottom portion 20 such that the bores 82c, 82h of the disk 54 align with the bores 16c, 16h of the bottom portion 20. The interaction between the recesses 84a and the pawls 18 facilitates aligning the first disk 54 with the body 12 and the bores 82c, 82h with the bores 16c, 16h.

The flow adjustment ring 62 is mechanically linked to the temperature adjustment ring 60. The temperature adjustment ring 60 is rotatively coupled to the bottom portion 20 and the flow adjustment ring 62 is translatably coupled to the temperature adjustment ring 60. This can be achieved by placing the link 41 onto the extensions 88 and 90 to corresponding bores 43 and 45 respectively. The first and second extensions 88, 90 are coupled to the bottom portion 20 such that they are free to rotate between the first and second arms 30, 32. A range of motion is defined between the first and second arms 30, 32, with a first position being established when either of the first extensions 88 or 90 contacts the first arm 30 of the body 12, and a second position being established when either of the second extensions 88 or 90 contacts the first arm 30 of the body 12. A second range of motion is defined by extensions 90 relative to extensions 88 where extensions 90 can translate a distance on either side of extensions 88 when the link 41 is rotated about the bores 43 rotatively receiving the extensions 88, guiding the extensions 90 in the arcuate grooves 45 toward either end of the arcuate grooves 45 so as to allow planar contact of the fixed disks 54 and the rotatable and translatable disk 50.

The recesses 84b of the disk 56 are aligned with the pawls 18b of the cap 14. The disk 56 includes a bore 25 that is capable of aligning with the bore 64 of the rotatable translatable disk 50. The cap 14 fixedly engages the first and second arms 30, 32 of the body 12 to maintain the relationship between the rotatable and translatable disk 50, stationary disks 54, 56, and adjustment rings 60, 62. The arms 30, 32 are received by the recess 48 of the cap 14, and the tabs 39 fixedly engage the apertures 35 formed in the first and second arms 30, 32. An optional O-ring 95 is disposed between the cap 14 and the second stationary disk 54, and facilitates preventing fluid from escaping therebetween, which may allow the fluid to be received through the central bore 42 of the cap 14. An optional tolerance spacer may be positioned between the cap 14 and the second stationary disk 56.

Figure 5:
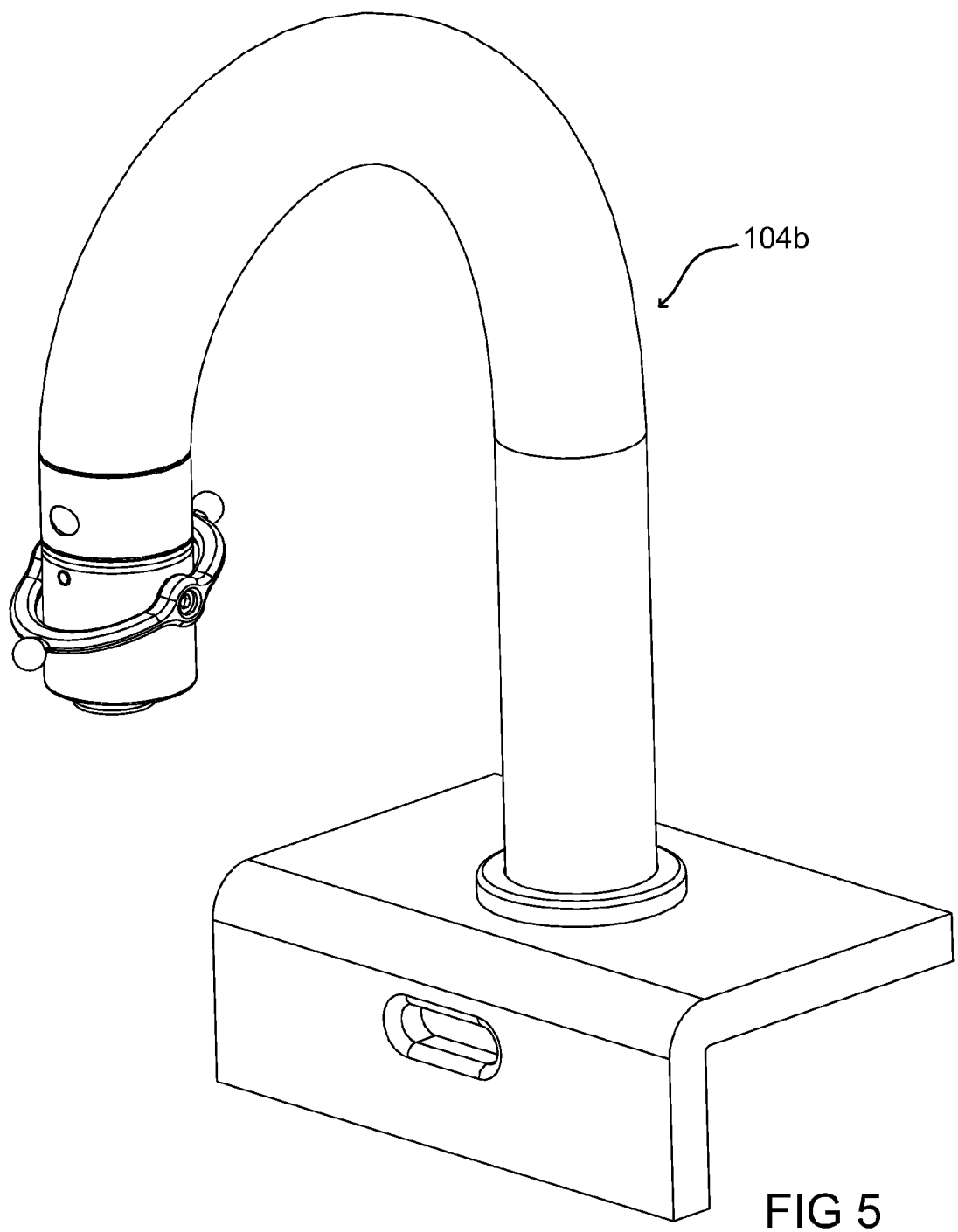

FIGS. 2-4 illustrate the exemplary valve 10 in connection with an exemplary faucet 104. As shown, an exemplary coupling 100 is operable to connect the valve 10 within a neck 110 of the exemplary faucet 104, which includes a spout 112. In one instance, the exemplary coupling 100 may be base mounted and include a housing 101 and a cap 103. The housing 101 is generally cylindrical in shape with a portion of the side walls removed to allow access to the valve 10, including the extensions 88, 90. In one instance, the housing 101 is similar to body 12. The cap 103 secures the body 12 within the housing 101. A threaded interface 107 is disposed between the housing 101 and the cap 103. A set of external threads 105 of the cap 103 connect the coupling 100 within the faucet neck 110. The exemplary valve 10 is adapted to the faucet 104 by substituting links 41b along with a key positioning adapter 37 configured to link the link 41b with a pivotal control ring 33 through a rotating cuff 31 as shown in FIG. 3. The valve 10 also includes first and second inlet ports 22 and 24. FIG. 5 shows a coupling 100 and exemplary handle configuration end mounted to a faucet 104b. In addition, a distal end 47 could extend through a modified rotating cuff 31 having a slot allowing for the axial movement of the distal end relative to the generally cylindrical valve body. Such a valve and cuff configuration could be either base mounted, wall mounted or spout end mounted as well. Other configuration, are also contemplated.

As can be appreciated from the above description, each disk 50, 54, 56 may seal at the interface with the adjacent disk(s). As such, a hard material valve disk or platen, e.g. ceramic, metal, synthetic or other suitable material, or suitably coated material with adequate wear and performance can be used. However, other types of valve disks, which provide sealing at the disk interface, may alternatively be utilized.

The exemplary valve 10 is operable to control the temperature of a flow of water entering the bottom portion 20 through bores 16c and 16h. The exemplary valve 10 regulates the flow of hot and cold water entering the bores 16c and 16h respectively to provide a desired output temperature and flow through the bore 42 of the cap 14. To control the flow of hot and cold water, the rotatable and translatable disk 50 is translated across the first fixed disk 54 from a first position to a second position to selectively align the bore 64 with the bores 82c and 82h, which are aligned with bores 16c, 16h of the bottom portion 20. Applying a force to the link 41 along the generally cylindrical valve axis causes arcuate grooves 45, a groove locus example, to rotate relative to extensions 88, thereby resulting in translation of extensions 90, flow control ring 62 and therefore the rotatable translatable disk 50 allowing for a no flow condition transitioning toward a maximum flow condition or a maximum flow condition transitioning toward a no flow condition depending on the axial direction of the force.

To allow a flow of cold water to reach the outlet bore 42, while maintaining the maximum flow condition, the temperature adjustment ring 60 is rotated generally from the first position to the second position by applying a force to the link 41 and, thereby, an axial rotative force about the generally cylindrical valve axis. Rotation of the temperature adjustment ring 60 causes concurrent rotation of the rotatable and translatable disk 50 about the generally cylindrical axis of the valve, whereby sufficient rotation of the rotatable and translatable disk 50 causes the bore 64 to align with the first bore 16c of the bottom portion 20 and more specifically with the bore 82c, thereby allowing a maximum flow of cold water to enter the valve body 12 and to flow to the outlet bore 42.

As the first extensions 88, 90 rotate from the first position to a mid position, the maximum flow of cold water transitions to a maximum flow of mixed water through the bore 64 and to flow to the outlet bore 42. The maximum flow of mixed water results from the maximum flow translation position of the rotatable and translatable disk 50 bore 64 overlapping both 16c and 16h, for example 82c and 82h in equal amounts. As the first extensions 88, 90 rotate from the mid position to a second position, the maximum flow of mixed water transitions to a maximum flow of hot water through the bore 64 and to flow to the outlet bore 42.

In the foregoing description, it should be understood that the flow of water entering through the first and second bores 16c, 16h is permitted to flow through the bores 82c, 82h formed in the stationary disk 54, and the bore 64 is independently adjusted for flow and temperature depending on whether a force is applied along the generally cylindrical valve axis or about the generally cylindrical valve axis in relationship to link 41. In this regard, the translation or rotation of the rotatable translatable disk 50 provides independent control for either flow or temperature via movement of peripheral or external link 41.

Figure 14:
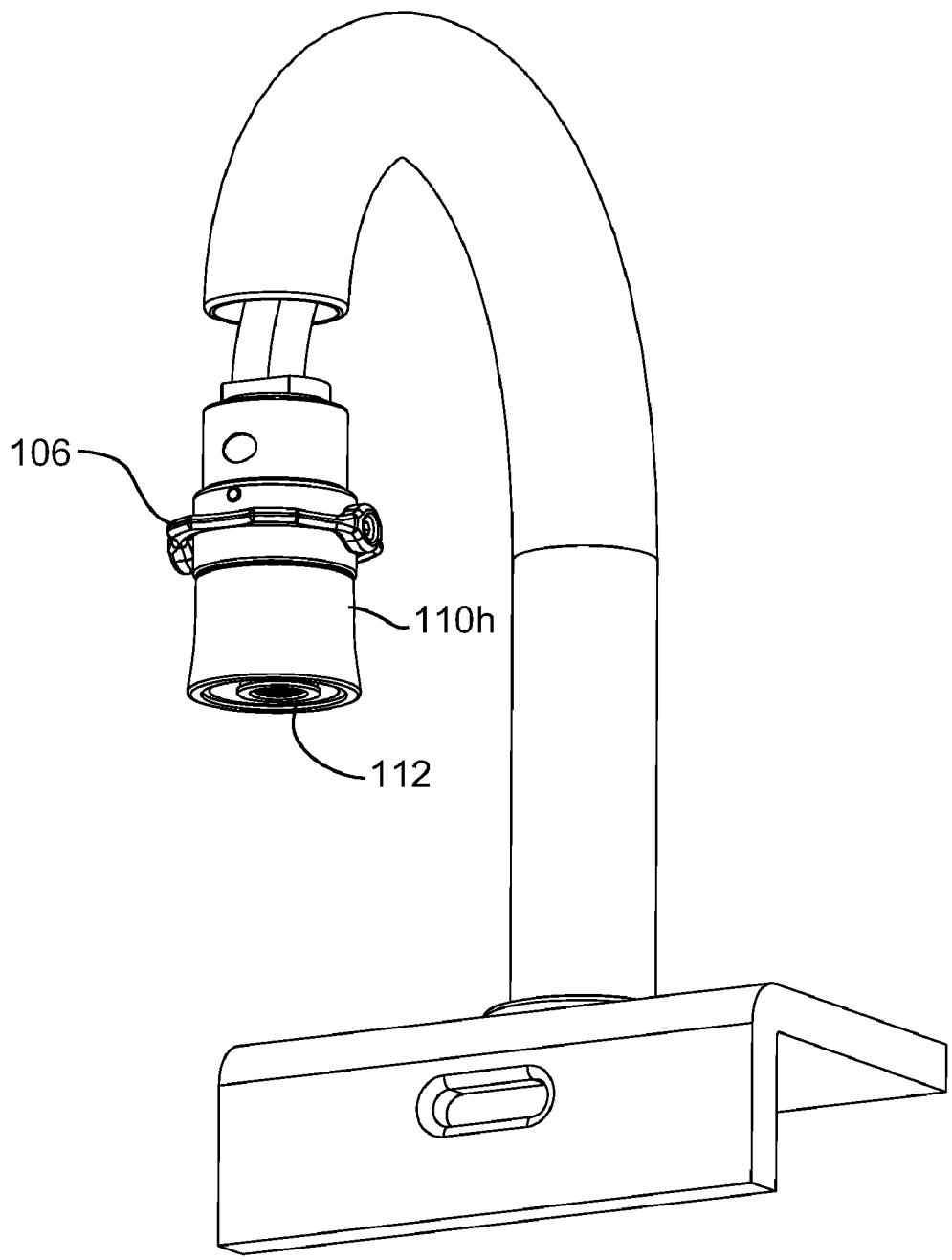
FIG. 14 illustrates a exemplary embodiment of a faucet utilizing an exemplary valve and components of FIG. 13 in a retracted or pulled out or hand held mode.

FIG. 6 illustrates an alternate exemplary embodiment. An exemplary valve 10a includes similar components as the exemplary valve 10. In the exemplary embodiment, a flow adjustment ring 62a is configured to include the central bore 42a and the outlet port 28a, which is operable to conduct the flow rate at which the water is allowed to flow through the body 12. The O-ring 95 seals the rotatable translatable disk to the flow adjustment ring 62a. A bearing 56b provides an optional lubricious interface between the flow adjustment ring 62a and the cap 14b. The exemplary valve 10a and 10 can be adapted to a proximate spout end mounted valve coupling as shown in FIGS. 5 and 14. Alternately, the exemplary valve 10a can be adapted to be a base mounted coupling with the addition of an adapter along with a preferably flexible and possibly partly spiral shaped tubular fluid carrying member where the use of such components may be pivotally and rotationally accommodating to an outlet end that may or may not accommodate movement. A base mounted approach with such an adaptive arrangement may be configured to have similar appearance as shown in FIG. 4. With various attachments, the optionally threaded end of central bore 42a can be adapted to be used in different faucets. Other configuration, are also contemplated.

With reference to FIGS. 1-6, other example of the valves 10 and 10a are contemplated. For example, the valve 10, 10a can be operable with the addition of outlet 61a in bottom portion 20 and outlet 61b in fixed disk 54. The couplings 100 can be configured to include an outlet for the other axially offset end portion operable to conduct the flow rate at which the water is allowed to flow back out of the bottom portion 20 whereby both axially offset end portions of the valves have outlets.

Figure 9:
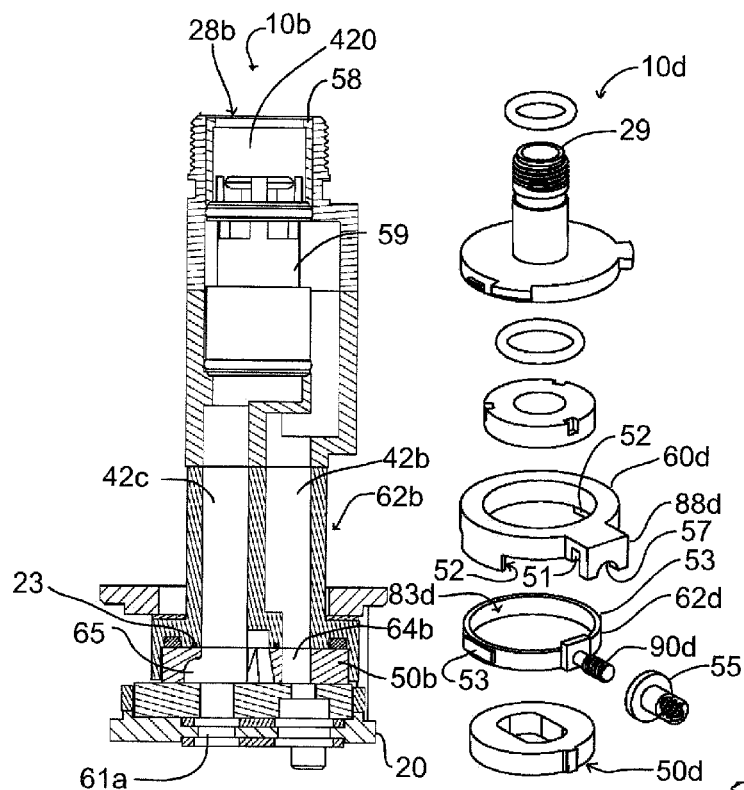
FIG. 9 is a partial cross-sectional view of the exemplary valve of FIG. 8.

With reference to FIGS. 7, 8 and 9, another exemplary embodiment is illustrated. The valve 10b includes similar components as the valve 10a. A flow adjustment ring 62b is configured to include a bore 42b, a channel 42c, a channel 420 including a configuration with diverter 59 and optional retaining sleeve 58 and outlet port 28b, operable to conduct the flow rate at which the water is allowed to flow through the valve body 12. Rotatable and translatable disk 50b includes a bore 65, which can carry outlet flow to an outlet 61a when diverter 59 operates to send flow in that direction. The bore 65 is surrounded by an optional seal 23 that may mitigate leakage. The diverter 59 functions in similar manner to numerous diverters used in kitchen faucets that also have a side spray. The activation of such side sprays cause the diverter 59 to divert flow from the faucet outlet or in this case outlet port 28b toward the side spray or in this case any connection that is fluidly connected to outlet 61a. A more compact configuration can be achieved by using different sized diverters.

The diverter 59 in the disclosed examples has a pair of diametric and a pair of face seals and the diverter 59 can be alternately assembled to divert in either direction and therefore accommodate different desired functionality. As shown in FIG. 9, fluid entering bore 64b travels to a peripheral location about the diverter 59 and then can be alternately diverted toward either channel 42c, 420 or outlet 61a, 28b direction depending on the orientation of the diverter 59 and activation of the diverted side of the flow system. The temperature adjustment ring 60d can be removed from the valve and instead can be externally mounted to a reduced sized valve diameter. Service kitchen faucets with additional pull down sprayers, which are typically shrouded with a coiled spring, may be configured to utilize a similar exemplary embodiment. The disclosed valves can be used in all areas of household use in addition to other areas. The use of a planar disk valve with an integrated diverter 59 does not have to be a flow through valve or mixing valve. For example, the diverter 59 can be positioned proximate one end communicating with an incoming fluid stream and two fluid channels and divert the fluid stream towards either channel. Other configuration, are also contemplated.

See FIG. 8 for the following description utilizing alternately referenced component names. By minimizing a distance between a resistive member 90 and a fulcrum 88 along a lever 41, while increasing or maintaining a second distance between an applied movement force at 47 and the fulcrum 88 along a lever 41, provides for improved mechanical advantage. The location of the groove locus or arcuate grooves 45 are in close proximity to the fulcrum or a rotatively mountable extension 88 so as to ultimately minimize the distance from a resistive force to the fulcrum.

Figures 10, 11:
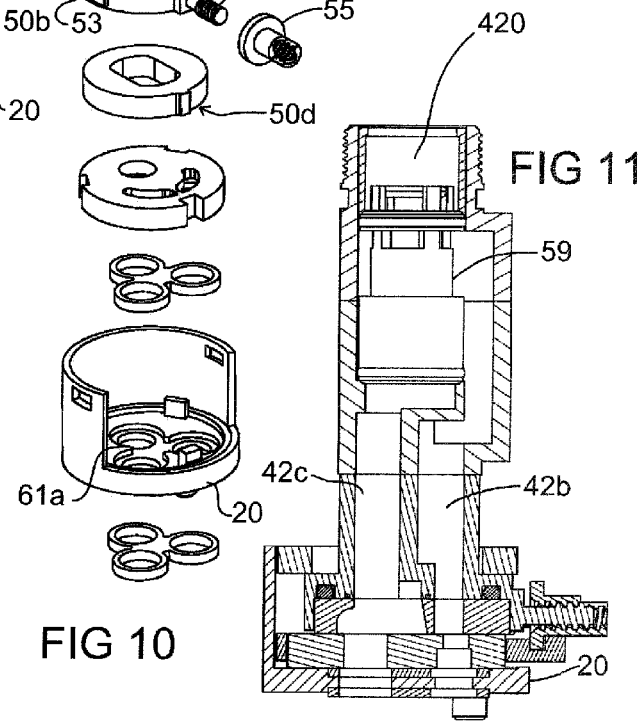
FIG. 10 is an exploded perspective end view of an exemplary valve.
FIG. 11 is a partial cross-sectional view of an exemplary auto-diverter valve version of a rotary style valve modified version of FIG. 9.

FIG. 10 illustrates another example. An exemplary valve 10d includes similar components as the valve 10. A flow adjustment ring 62d is configured to include a threaded extension 90d, side walls 53, and a temperature adjustment ring 60d is configured to include an extension 88d having a flange slot 51, a positioning arch 57 and guide walls 52. Threaded extension 90d threadedly engages rotational threaded flange member 55 to the flow adjustment ring 62d, where the flanged edge of flange member 55 is rotatably fitted to flange slot 51. While flange member 55 rotates relative to the temperature adjustment ring 60d there is not translation of flange member 55 relative to temperature adjustment ring 60d. The arrangement of components 55, 62d and 60d along with the moveably engaged side walls 53 and guide walls 52 allow for translation and rotation of the rotatable and translatable disk 50d. The rotatable and translatable disk 50d is received by bore 83d of the flow adjustment ring 62d. The rotational threaded flange member 55 cannot rotate about the generally cylindrical valve axis relative to the temperature adjustment ring since it is rotatively engaged with positioning arch 57. As such, at a given rotational position of the flange member 55, there is no change in flow rate when the temperature adjustment ring is rotated relative to the generally cylindrical valve axis. This may help to mitigate unintended change in flow due to a translated migration of a rotational translatable disk.

The rotatable translatable disk 50d is keyed to the flow adjustment ring 62d. The rotational threaded flange member 55 in the exemplary configuration allows for a rotary adjustment of flow rather than applying a force to a linked lever member along, or parallel to a generally cylindrical valve axis. This allows for finer and more precise control of the flow in addition to a higher likelihood of a user being more conscious of flow rate and therefore more likely to conserve or use less water on average use. The example FIGS. 10 and 11 allow for a rotational adjustment of flow control in a configuration that has not been available in state of the art planar disk mixing valves or faucets. Valve 10d can be adapted to a proximate spout end, wall mounted or base mounted valve coupling. This approach also allows for numerous faucet configuration methods and styles including configurations to interface solenoid motors for other various applications where rotation in two axes, not requiring the interface of a lever arm, is convenient. FIG. 11 shows a section view of an auto diverter exemplary valve utilizing a rotary control flange.

Additional exemplary embodiments allowing for the elimination of a second stationary disk, repositioning of the temperature control ring, opposing end outlets and automatically diverted outlets as was achieved with the prior groove locus versions, are variants which may result in outlet end, base or wall mounted couplings for use in faucets with the rotary style interface. Also, flange member 55 can be alternately configured with a geared end so as to be interfaced with alternate rotational or gearing arrangements.

FIG. 12 illustrates another embodiment. A valve 10H includes the similar components as the valve 10A. A flow adjustment ring 62h is configured to include the central bore 42h, end portion 29h and the outlet port 28h operable to conduct the flow rate at which the water is allowed to flow through the body 12h. The O-ring 95 seals the rotatable translatable disk 50 to the flow adjustment ring 62h. The bearing 56b provides an optional lubricious interface between flow adjustment ring 62h and temperature adjustment ring 60h. A bearing 56h provides an optional lubricious interface between the temperature adjustment ring 60h and the cap 14h. Link 41h is assembled to temperature adjustment ring 60h with fulcrum pins 88h. Flow adjustment ring 62h receives link extensions 90h in symmetrically placed receiving joints 45h. Similar manipulation of the link 41h allows for the independent control of both temperature and flow. Rotational limit travel is provided by extensions 88 meeting with a stop feature (not shown) inside of the interstitial space of the body 12h. The valve 10h can be adapted to a proximate spout end mounted valve coupling as shown in FIGS. 13-16. Other configuration, are also contemplated.

FIG. 13 shows coupling 100h with a non-rotative extension coupling 77, having a rotational void 81, fasten-able to coupling 100h. While link interface 79 is a rotative sleeve that engages link 41h so as to couple pivotal control ring 33h, modified with voids 49 for interface with an operators thumb, finger or hand, so as to operate the valve in a hand held, fixed or docked position. Rotational sleeve 87 is placed around extension coupling 77 and the key 85 is keyed to link interface 79. The pivotal control ring 33h is keyed to key 85 and coupled by fasteners that link the ring 33h to the link 41h for operative control of the valve while optional grip 89 may be fastened to the end of extension coupling 77, this allows a user to hold grip 89, or the plain end of extension coupling 77 and the exemplary configuration while allowing a finger or thumb to control the ring 33h as with, the valve operation is adjusted by rotation about the generally cylindrical valve body or translation along or parallel to the generally cylindrical valve axis. A control member 106 is operably coupled to the valve (10h) for independent control of both temperature and flow rate of water to the spray outlet 112.

FIG. 14 illustrates a hand held fluid delivery device 110h, or single hand held single handle mixer where independent control of both temperature and flow rate is achieved. Optional spray pattern button along the periphery of the hand held configuration can interface an outlet end. In a variation, the maximum flow position of the control ring or other control means is utilized to activate optional flow patterns, depending on which valve configuration is internal. Note that several of the valves disclosed herein are configurable to operate in numerous different faucet configurations, some of which are shown here. In addition, a valve configuration that allows for a 90 degree exit direction relative to the generally cylindrical axis could be configured to be pulled up and out of an optionally rotative counter mounted sleeve. Such an arrangement would not require a similar extension coupling 77 of FIG. 13 and would allow the user to hold a coupling end. All couplings could also be integrated to the bottom portions along with the inlet and optional outlet tubular members of various geometries, materials and configurations.

Figures 15, 16:
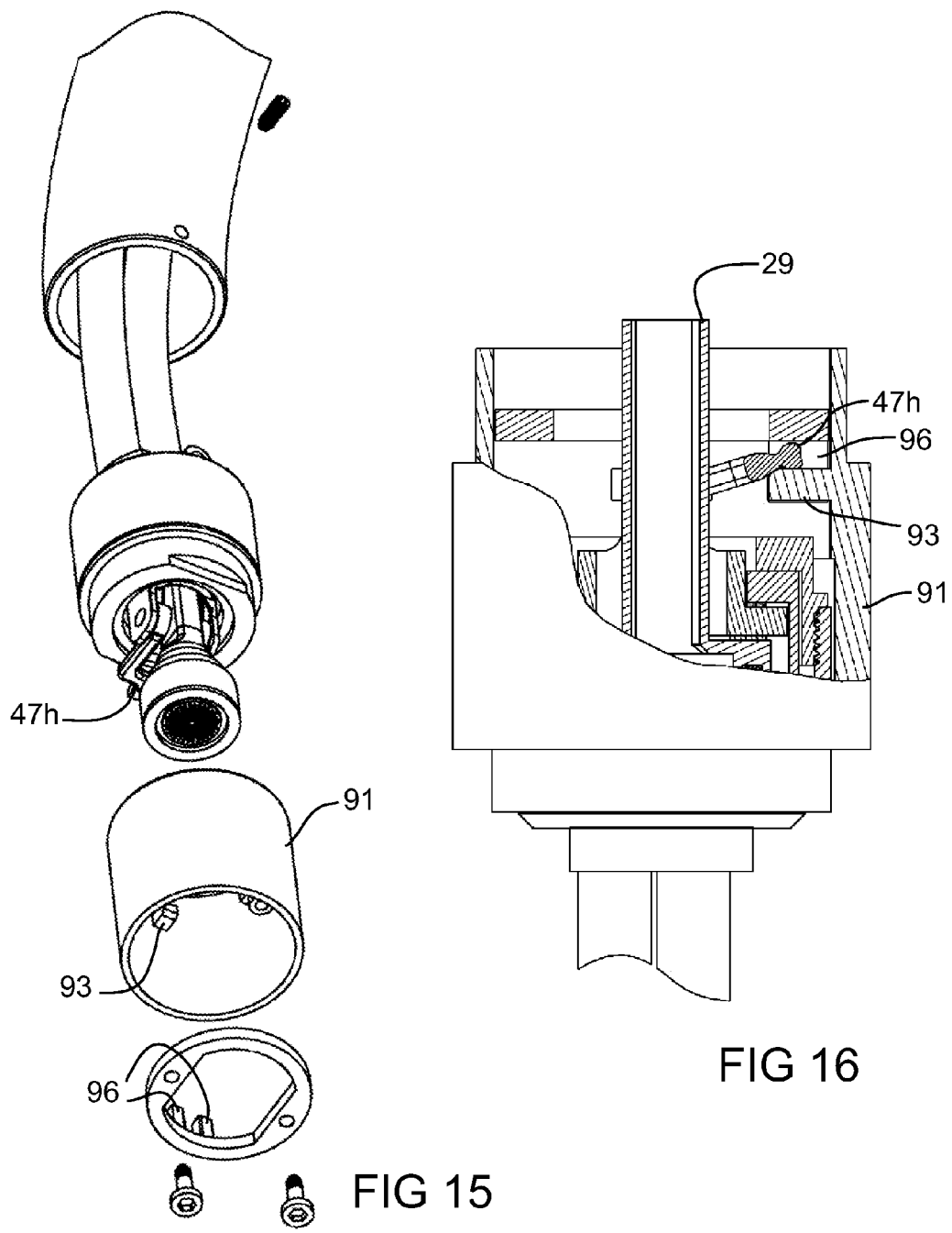
FIG. 15 is an exploded perspective view of an exemplary coupling with the exemplary valve of FIG. 12 with alternate exemplary handle sleeve control components.
FIG. 16 is a partial cross-sectional view of the exemplary configuration of FIG. 15.

FIG. 15 shows a coupling with components to achieve minimalist appearance and function. FIG. 15 shows a rotatable translatable sleeve 91 that captures distal end 47h between extension 93 and extensions 96 as similarly shown in FIG. 16.

Figures 17, 18:
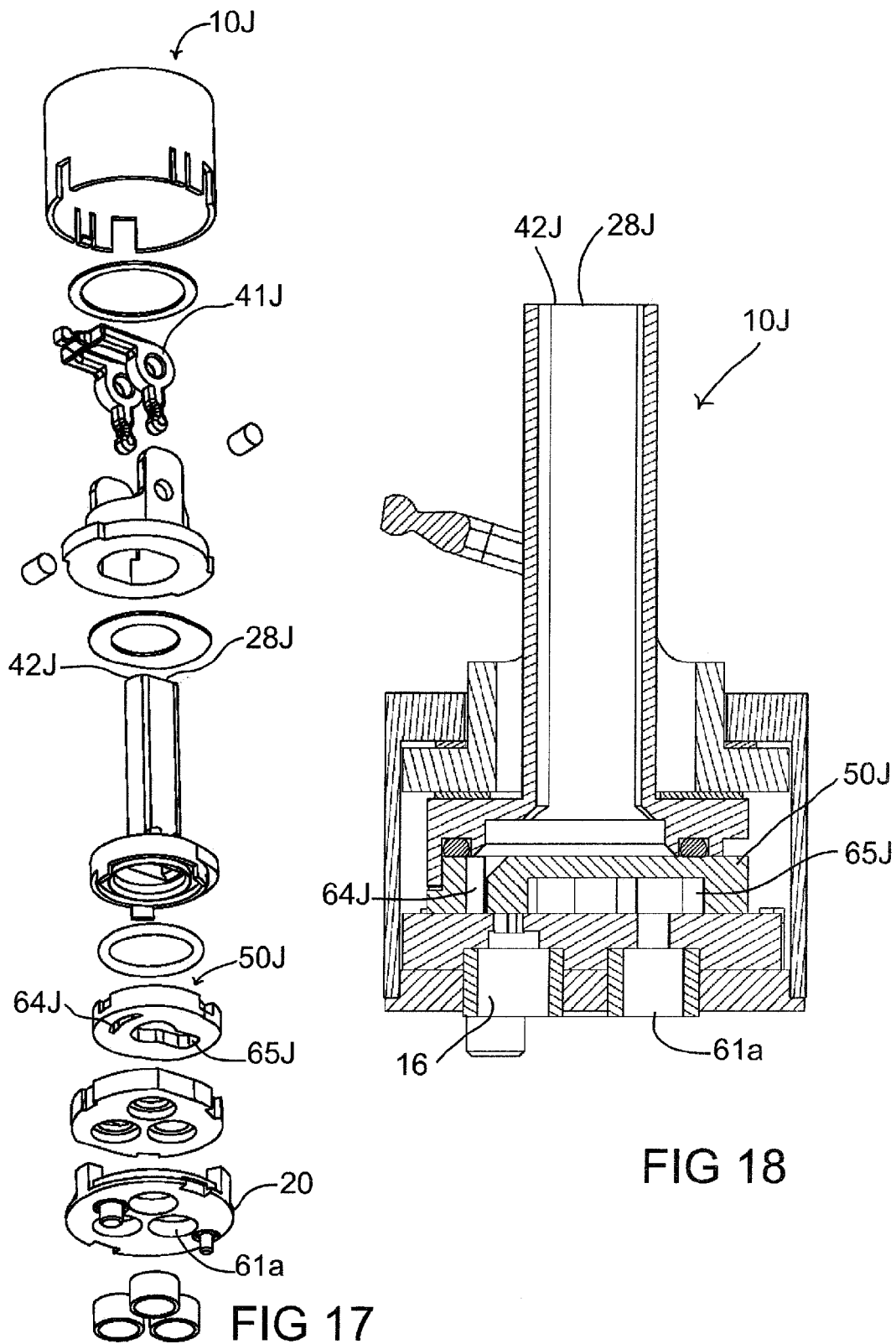
FIG. 17 is an exploded perspective end view of an exemplary valve.
FIG. 18 is a cross-sectional view of the exemplary valve of FIG. 17.

FIG. 17 illustrates another exemplary embodiment. A valve 10J includes similar components as the valve 10h. Rotatable translatable disk 50J has a flow through bore 64J and, in this configuration, an additional partial opening or void 65J that does not allow for flow through fluid communication in this exemplary embodiment. Rather, the void 65J is configured so that when the link 41J is manipulated to adjust flow in one direction the flow is selectively communicated with the outlet 61a. Alternatively, bore 64J is configured so than when link 41J is manipulated to adjust flow in another direction the flow is selectively communicated with outlet port 28J to allow for flow through fluid communication from a first axially offset end to another axially offset end.

Figure 19:
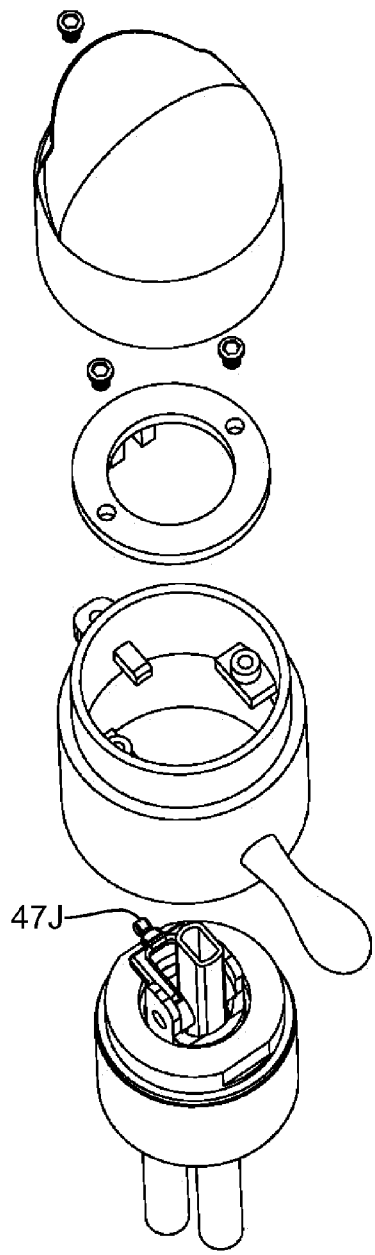
FIG. 19 is an exploded perspective view of an exemplary coupling with the exemplary valve of FIG. 17 with exemplary handle sleeve control components.

FIG. 18 illustrates the flow from inlet 16 toward either selectable fluid path leading toward outlet 28J or 61a dependant on the position of the rotatable translatable disk 50J. FIG. 19 shows a tub spout exemplary coupling sleeve configuration that captures distal end 47J of exemplary valve 10J. FIG. 19 shows similar sleeve components as shown in FIGS. 15 and 16 in addition to a tub spout end cap. The exemplary coupling with control sleeve configuration allows for selective flow, selective temperature and the selective operation of either a shower or other mounted or hand held fluid dispensing devise (not shown) utilizing outlet 61a or a tub spout utilizing outlet 28J, depending on whether the tub spout or sleeve arrangement is pushed or pulled along the generally cylindrical valve axis. Detent stops or interfering tabs indexing positions may be used to help the user position the valve control in an off position. Rotation of the tub spout or faucet about the generally cylindrical valve axis adjusts the temperature of the flow for either selectable output mode. Other configuration, are also contemplated. One such example includes a selectable valve configuration that allows for a single grip control where lifting a handle and rotating the handle allows for typical faucet flow and temperature control. Alternately, a user utilizing a drinking vessel or cup to press down on the handle allows for the selective dispensing of filtered water as can be dispensed from a filter configuration and spout above the handle control or fluidly linked to the handle control. This configuration allows for a filter that is accessible to the user above a counter mounted position and yet the filter is not obstructively located proximate the spout end of the unfiltered spout end faucet. In addition, numerous forms of water treatment are possible with the selectable outlet valve configuration options in other flow through valve designs as well. The exemplary embodiment of the selectable valve can be configured in other similar exemplary embodiments where a fluid treatment is desired.

Flow through a valve with selectable paths may have the translation or volume controlling throw positions divided into two or more index-able positions to allow for a user interface that provides response feel to the user when pressing a handle down. Part of the response throw could be momentary and then transition into a fixed position of outflow. This can be accomplished by use of indents with corresponding cavities located in the interfacing parts in addition to other various methods. Use of a spring or incorporating geometry into a memory retaining polymer would also suffice for such an application.

Figure 20:
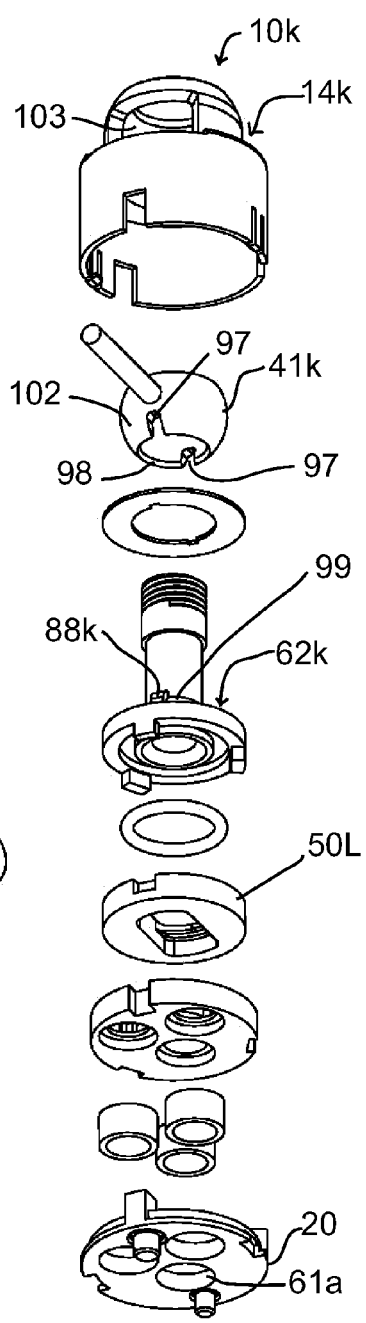
FIG. 20 is an exploded perspective end view of an exemplary valve.

FIG. 20 illustrates another exemplary valve 10k. Valve 10k includes similar components as the valve 10h. The function of temperature control ring 60h, the fulcrum pins 88h and the link 41h are unified in spherical shaped link 41k. The link 41k includes a spherical area 102 that is spherically received by an internal spherical portion 103. Spherical area 102 includes dual slots 97. A spherical cut 98 interfaces with a spherical portion 99 of the flow adjustment ring 62k. Extensions 88k are received by slots 97 and may allow rotational adjustment of the flow adjustment ring 62k and the rotating translating disk 50L. Translation of the flow adjustment ring 62k may be achieved by the fixed spherical portion 103 engaging spherical portion 102 so that spherical portion 99 causes translation due to engagement with spherical cut portion 98 while spherical area 102 is spherically rotated within the internal spherical portion 103. The illustrated flow through version of this valve can be configured without flow through function as well. Manipulation of link 41k results in similar control of temperature and flow to the prior examples. The valve 10k has fewer components than similar functioning prior art valves.

The approach of a sphere, namely the link 41k within a spherical housing, namely the cap 14k where the sphere link 41k further interfaces the spherical portion 99 of the ring 62k where the sphere link 41k has a spherical shaped void with rotationally functional notches or slots 97 that engage the extensions 88k results in a control approach that can accommodate different functioning valve configurations.

Figure 21:
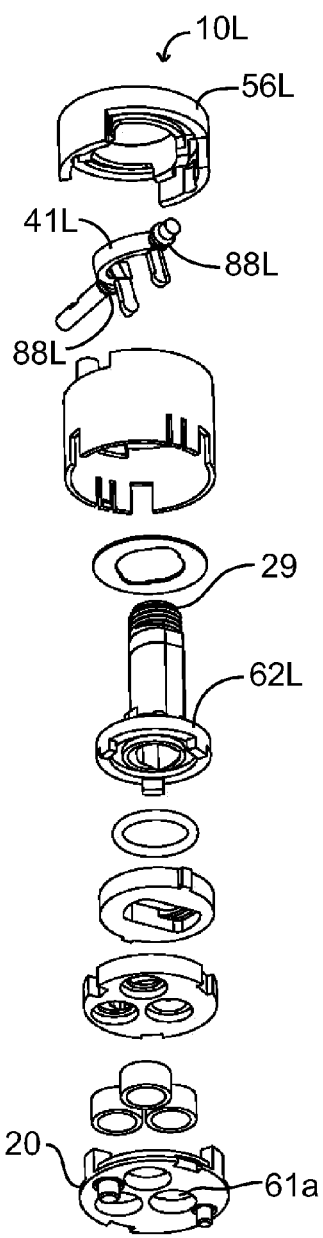
FIG. 21 is an exploded perspective end view of an exemplary valve.

FIG. 21 illustrates another exemplary embodiment. A valve includes similar components as the exemplary valve 10h. In this embodiment, the function of temperature control ring 60h, fulcrum pins 88h and link 41h have been unified in shaped link 41L. The link 41L has dual spherical extensions 88L along a symmetrically positioned shaft that may interface with a radial channel that captures spherical extensions 88L and facilitate rotational manipulation of the flow control ring 62L. The extensions 88k are captured by a link retainer 56L. The illustrated flow through version of this valve can be configured without flow through function as well. Manipulation of the link 41k results in similar control of temperature and flow to prior examples. Valve 10L has fewer components than similar functioning prior art planar disk mixing valves. The approach of exemplary valve 10L results in a control approach that can accommodate different functioning valve configurations including pivotal joy stick controlling of moveable mixing disks that are moveable with 2 degrees of freedom.

It should be understood that while some of the exemplary valves are shown configured with the respective exemplary faucets, that the various exemplary valves 10-10L and alternate exemplary embodiments shown or referred to could also be substituted in place of many different faucet designs some of which are shown here. In addition, versions that utilized the mechanical linkages shown here need not be flow through valves conducting fluid in one axially offset end portion toward and out of another axially offset end portion. Also, the axially offset end portions could have a plurality of selectable or non-selectable outlets on either end portion. The various outlet ends could have various fluid treatments and adaptable fittings to achieve various alternative configurations.

For example a dual outlet, optionally hand held valve could have dual outlets to facilitate separate or mixed optional spray patterns on dual outlets at a single axially offset end portion. One such example of a modified version of valve 10J could be accommodated by isolating two flow paths and outlets along bore 42J connecting with two separate openings 64J and 65J respectively, where 65J has a material free opening portion that extends fully through disk 50J and thus connects fluid to one of the two isolated outlets along outlet bore 42J. A version of FIG. 14 with a modified valve 10J configuration allows for two isolated selectable paths at the flow through outlet end. Thus, optional spray patterns could be achieved by tilting ring 33h along either generally cylindrical axial direction. Yet another example would have dual selectable or non-selectable outlets on either axially offset end portion so as to utilize one or more of the dual outlets on an axially offset end portion separately, proportionately or simultaneously. A configuration with two isolated flow paths and outlets, or a single flow path outlet along an outlet bore may be combined with, or interface with a diverter 59 or diverting means, the activation of which may be position dependant with regard to a surrounding sleeve or area along a periphery of such a dual path outlet bore. Alternate spray patterns may be achieved by use of diverting means along a fixed outlet bore linked to a user interface or activation mechanism. Also, the moveable disk and temperature control ring in the exemplary valves with automatic diverter could be reconfigured and reverse positioned to allow for an inlet flow at what was the first outlet end capable of automatically diverting from another outlet path to a selectable outlet path or mix thereof. In addition, a modified version of valve 10J could be accommodated by isolating two flow paths and outlets along bore 42J connecting with two separate openings 64J and 65J respectively, where 65J has a material free opening portion that extends fully through disk 50J and thus connects fluid from a newly designated inlet port 61a to one of the two isolated outlets along outlet bore 42J. Such a version of a modified valve 10J configuration allows for two isolated paths at the flow through outlet end where one of the two outlets could dispense a third fluid or filtered water entering the valve at port 61a. Similarly, the modified version of valve 10J could have the disk 50J with the modified and pass through opening portion of 65J configured to be selectively activated by positioning opening 65J in a manner that would symmetrically position 65J to look like the portion of 64J mirrored along the opposite side of the valve section shown in FIG. 18. Such a valve with modified disk 50J would allow for the selective dispensing of a third inlet fluid or filtered water through the second isolated path along a modified bore 42J. A non flow-through valve can also be utilized to accommodate the appearance of many current styles and designs of faucets where a protruding portion with a handle emanating from such variously arranged protrusions are common place due to the limitations of commonly used single grip planar disk mixing valves.

Bottom portions of the various valves 10-10L and numerous alternate examples could be configured to be independently functional without need for the various corresponding valve couplings as shown. Use of over-molded integrated tubular members unified with bottom portions are also contemplated. Also, an alternative end portion could integrate the functions of a stationary disk and end portion thus making such a disk optional.

Various exemplary valves are flow through valves that accommodate an in line flow through path wherein the fluid enters through one end, traverses through the housing along a longitudinal direction through a full range of temperature and flow operation, and exits axially through the other end.

In addition, there are obvious additional parts that are used so as to minimize the number of required valve designs. Many of the parts can be eliminated where custom valves are adapted for specific faucet and valve configurations. It is the desire of this disclosure to try and limit the numerous exemplary embodiments that it would take to show all such part reductions.

The exemplary valves can be configured to function as a valve that relies on a side translation for temperature adjustment (often referred to as pivotal ball operation or joystick control). This style does not rely on an axial rotation relative to the cylindrical axis of the valve body in order to adjust temperature as is common in most single handle planar disk mixing valves.

All of the valves, valve seats and valve configurations are intended for use with optional materials and flexible supply lines, that may or may not be optionally molded into a bottom portion of various materials, as well as fixed copper supply lines or a combination thereof. The use of flexible supply lines in various configurations, all of which can have pivotal spouts as is common in kitchen faucets that require movement or limited movement relative to a fixed mount is implied and optional in the examples displayed or referred to. Other connection methods that do not require movement of the supply lines in order to rotate a spout are common and easily accommodated with commonly available components and mounting methods which are also alternately implied in the exemplary embodiments displayed or referred to.

The use of pivoting, rotational attachments, which allow for a hose or fluid communicating member to rotate and translate freely in order to accommodate certain exemplary valves in alternate valve and faucet configurations are contemplated. In addition, certain rigid or flexible fluid carrying members in different geometric configurations, including partial or complete spiral shaped and or dual fluid carrying tubular members which conduct fluid, may have adequate properties to allow for rotation and translation; and the use of such components is intended in configurations where outlet fluid or supply fluid may be channeled through such members. There are numerous attachment or mounting methods for numerous attachments ranging from sonic welding, to threaded engagement and other commonly practices methods dependant on the materials selected for the various interfacing components. Numerous attachments may also interface with one or more of a plurality of outlets that are possible at either end portion of the exemplary valves shown, described or alternatively configurable. The openings in the stationary disks and moveable disks can be configured to be a plurality of openings that may or may not all or in part be openings that are part of material free portions that pass all the way through the disks. Furthermore, those openings may or may not be alignable with adjacent disks openings possibly dependent on positioning. Other configuration are contemplated.

Also, there are numerous possible combinations when comparing all the different exemplary configurations, valves, valve positions, configuration styles with alternatively mounted valves for use in many different faucets. All possible combinations and alternative positioning of features and components are claimed herein. Alternate valves can be configured to accommodate functions of the exemplary valves by using similar components to achieve the desired functions of the different exemplary valves. For example, the disk 50J in valve 10J and the alternate configurations of 50J could be configured to function with similar components to the valve 10a. Other configuration are contemplated.

The prior art single handle planar disk mixing valves with independent control of both flow and temperature usually have flow rate losses due to an approximately 180 degree change in flow direction when comparing the direction a fluid enters such valves. Since an in line flow through valve has flow entering in one end and out an other end, the reduced disruption of the flow may result in a higher flow rate relative to the valve size.

Thus, in line flow through valves can be smaller in size and yield comparable flow to larger valves or provide valves that can be similar in size and yield larger flow.

The use of the exemplary valves described, referred to or alternative configurations of such valves may be configured to function with water fall or fountain style faucets including other faucets allowing for various fluid treatments. Fluid treatment refers to any desired treatment of fluid for a desired condition also including, flow condition, aeration, spray pattern, flavor, filter, or use in or with an appliance or device.

The mechanisms for moving a first disk, that is moveable with 1 or 2 degrees of freedom relative to a second disk, by way of a peripheral, at least translating, linkage that is in communication with said first disk and said communication occurs beside a generally cylindrical longitudinal axis, can be used for other devices utilizing disk pairs that can have inlets and or outlets on either end including radial outlets. For example, mixers and diverters that are used in tub and shower configurations for selecting one of or various combinations of various spray outlets can be configured with the various disclosed peripheral control mechanisms and variations thereof. Furthermore, diverting valves receiving a mixed flow can be proportionately diverted to a plurality of outlets or mix thereof by the mechanisms disclosed herein for moving disks relative to a fixed disk.

The above description of specific exemplary embodiments has been given by way of example. From the disclosure given, those skilled in the art will not only understand the general inventive concept and its attendant advantages, but will also find apparent various changes and modifications to the structures and methods disclosed. It is sought, therefore, to cover all such changes and modifications as fall within the spirit and scope of the general inventive concept, as defined herein, and equivalents thereof.

The invention is claimed to be:

1. A hand-held fluid delivery device, comprising:
   a spray outlet;
   a valve, including:
      a rotatable translatable disk that selectively controls a flow of water to the spray outlet and selectively controls a temperature of the water to the spray outlet;
      a temperature adjustment ring;
      a link with extensions;
      fulcrum pins; wherein the link is coupled to the temperature adjustment ring with the fulcrum pins;
      a flow adjustment ring with an outlet port operable to conduct the flow of water and including receiving joints, wherein the receiving joints receive the extensions of the link; and
   a control member operably coupled to the valve to provide independent control of both the temperature of the water and the flow of the water to the spray outlet.

2. The hand-held fluid delivery device of claim 1, wherein the control ring is adjusted by rotation or translation.

3. The hand-held fluid delivery device of claim 1, wherein the spray outlet changes position in accordance with the rotatable translatable disk.

4. The hand-held fluid delivery device of claim 1, wherein the spray outlet changes position as a function of flow control.

5. The hand-held fluid delivery device of claim 1, the valve, further comprising:
   an O-ring that seals the rotatable translatable disk to the flow adjustment ring.

6. The hand-held fluid delivery device of claim 5, the valve, further comprising:
   a bearing that provides a lubricious interface between the flow adjustment ring and the temperature adjustment ring.

7. The hand-held fluid delivery device of claim 6, the temperature adjustment ring, comprising:
   extensions that provide a rotational stop feature inside the valve.

8. The hand-held fluid delivery device of claim 1, wherein the receiving joints are symmetrically disposed.

9. The hand-held fluid delivery device of claim 8, the valve, further comprising:
   a cap; and
   a bearing, wherein the bearing provides a lubricious interface between the temperature adjustment ring and the cap.

10. The hand-held fluid delivery device of claim 9, further comprising:
    a non-rotative extension coupling, including a rotational void.

11. The hand-held fluid delivery device of claim 10, further comprising:
    wherein the control member comprises
    a pivotal control ring having voids configured to be operated by an operators thumb, finger or hand; and
    a rotative sleeve link interface that engages the link so as to couple to the pivotal control ring.

12. The hand-held fluid delivery device of claim 11, further comprising:
    a key coupled to the link interface; and
    a rotational sleeve disposed around the extension coupling.

* * * * *